United States Patent [19]

Nakamura

[11] 3,860,225

[45] Jan. 14, 1975

[54] SHOCK ABSORBER

[75] Inventor: Masahiro Nakamura, Toyota, Japan

[73] Assignee: Toyota Jidosha Kogyo Kabushiki Kaisha, Toyota-shi, Aichi-ken, Japan

[22] Filed: July 23, 1973

[21] Appl. No.: 381,520

[30] Foreign Application Priority Data
  Apr. 5, 1973   Japan.............................. 48-39067
  July 27, 1972  Japan.............................. 47-75264

[52] U.S. Cl................. 267/64 R, 188/289, 293/86
[51] Int. Cl.......................... B60g 11/26, F16j 5/00
[58] Field of Search............... 293/1, 24, 60, 70, 73, 293/85, 86, 89, DIG. 2; 213/223; 188/289; 267/64 R

[56] References Cited
UNITED STATES PATENTS

| 2,516,667 | 7/1950  | Bachman....................... | 188/289 X |
| 2,963,175 | 12/1960 | Thornhill....................... | 213/223   |
| 2,992,817 | 7/1961  | Templeton..................... | 188/289 X |
| 2,994,442 | 8/1961  | Frederick....................... | 213/223 X |
| 3,152,667 | 10/1964 | Powell........................... | 188/289   |
| 3,656,632 | 4/1972  | Karakashian et al........... | 213/223 X |

FOREIGN PATENTS OR APPLICATIONS 799,760   8/1958   Great Britain...................... 188/289

Primary Examiner—M. Henson Wood, Jr.
Assistant Examiner—Andres Kashnikow
Attorney, Agent, or Firm—Stevens, Davis, Miller & Mosher

[57] ABSTRACT

In a shock absorber for use in a car, wherein a variable-area orifice is formed by a rod insertedly provided inside an outer cylinder and a hole provided in a plunger coupled to an inner cylinder, the improvement comprising the fact that apertures being open into a jet stream area immediately downstream of the variable-area orifice are formed in the plunger. In case of the collision of the car at high speed, operating oil inside the outer cylinder is sucked out, not only through the orifice, but also through the apertures, so that the internal pressure of the outer cylinder is prevented from rising abruptly.

8 Claims, 11 Drawing Figures

SHOCK ABSORBER

The present invention relates to a shock absorber which is assembled in use between the body and a bumper of a car.

Relying only on a variable-area orifice formed by a hole of a plunger coupled to an inner cylinder and a taper rod insertedly provided in an outer cylinder, a prior-art shock absorber makes use of the dynamic viscous resistance or the resistance force in the so-called square proportion to the velocity at the time when operating oil in the outer cylinder flows. As a consequence, the internal pressure of the shock absorber becomes extremely high at collisions in a high speed region. This has sometimes caused the rupture of the shock absorber itself, or the rupture of a structure, such as the car body, on the side on which the shock absorber is mounted.

The present invention has eliminated the disadvantage of the prior-art shock absorber with a construction in which, in addition to the variable-area orifice formed by the rod insertedly provided inside the outer cylinder and the hole provided in the plunger, apertures being open into a jet region immediately downstream of the variable-area orifice are formed in the plunger.

The principal object of the present invention is to provide a shock absorber in which apertures extending from the interior of an outer cylinder and communicating and being open into a jet region immediately downstream of a variable-area orifice are provided, so that when the velocity of operating oil flowing through the variable-area orifice becomes high upon a collision at high speed, to give rise to a pressure drop around the jet region immediately downstream of the orifice, the operating oil in an oil chamber inside the outer cylinder is also sucked out through the apertures towards an oil chamber inside an inner cylinder, to prevent the pressure in the interior of the outer cylinder from rising abruptly or in proportion to the square of the velocity, whereby the rupture of the shock absorber itself at the collision in a high speed region, the rupture of a structure on the shock absorber-mounting side, such as the car body, in the course of operation, and the like accidents are prevented from occurring.

Further objects are to provide a shock absorber which acts under resistance forces of moderate velocity-dependency owing to the formation of the apertures in the plunger, to avoid structural complication, and to prevent the strength of each constituent part from being weakened.

The above-mentioned and other objects as well as the novel features of the present invention will become more fully apparent from the following detailed description when read with reference to the accompanying drawings. The drawings, however, are merely for elucidation, and do not restrict the scope of the present invention.

Figure 1:
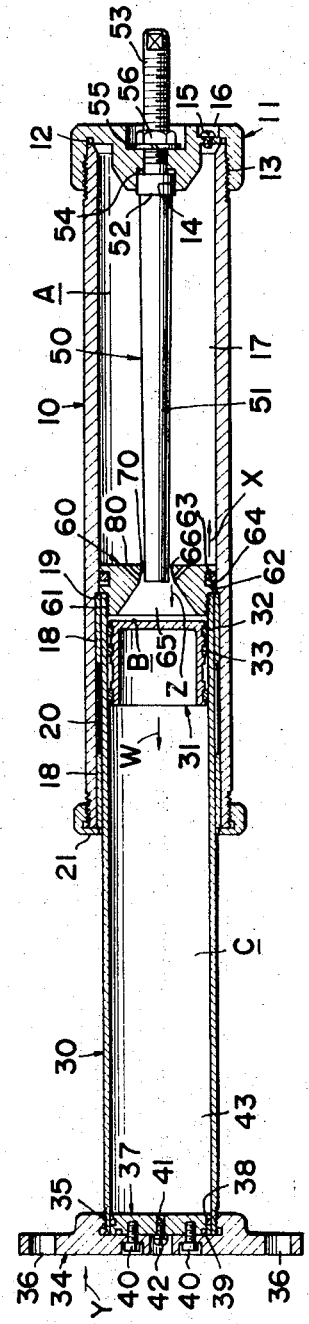
FIG. 1 is a front view, in vertical section, showing the first embodiment of the present invention.

As shown in FIG. 1, the shock absorber according to an embodiment of the present invention includes an outer cylinder 10, an inner cylinder 30, a plunger 60 which is coupled to an end of the inner cylinder 30, and a variable-area orifice 70 which is formed by a rod 50 insertedly provided in the outer cylinder 10 and a hole 66 provided in the plunger 60.

The rod 50 is the so-called taper rod which has a taper towards its front end to be inserted into the hole of the plunger.

One end part of the outer cylinder 10 (the right end part as viewed in FIG. 1) is tightly closed with a cap 11, while the other end part is opened so as to fittingly receive the inner cylinder 30. The interior of the outer cylinder 10 is made an oil chamber A.

The cap 11 is airtightly contacted with an end face of the outer cylinder 10 through a packing 12, and is fittingly mounted on the outer cylinder 10 by screw threads 13, whereby it hermetically seals one end part of the outer cylinder 10.

At the center of the cap 11, a supporting hole 14 is provided in order to fittingly support the taper rod 50.

The taper rod 50 has such shape that a taper portion 51, a large-diameter portion 52 and a screw portion 53 are continuous. The taper portion 51 is disposed inside the outer cylinder 10. The large-diameter portion 52 is fittingly inserted into the rod supporting hole 14 of the cap 11 with a packing 54 held between the portion 52 and the bottom of the hole 14. In the screw portion 53, a nut 56 is fitted through a washer 55. Thus, the taper rod 50 is insertedly disposed in the outer cylinder 10 through the cap 11.

The cap 11 is provided with an oil inlet 15, through which operating oil 17 is filled into the oil chamber A from the exterior. The operating oil 17 may be non-compressible oil or compressible oil. During use of the shock absorber, the oil inlet 15 is closed by a plug 16.

At the other end part of the outer cylinder 10, sleeves 18, 18 are fittingly engaged in order to make the movement of the inner cylinder 30 smooth. The sleeves 18, 18 are fixed by means of a shoulder portion 19 formed inside the outer cylinder 10, a spacer 20 disposed therein, and a cap type stopper 21 fittingly secured to the end of the outer cylinder 10.

One end part of the inner cylinder 30 (the right end part as viewed in FIG. 1) is inserted into the outer cylinder 10. To the end part inserted into the outer cylinder 10, the plunger 60 is coupled. A free piston 31 is received in the interior of the inner cylinder 30.

At the other end part of the inner cylinder 30, a flange 34 and a lid 37 are fittingly mounted. In the interior of the inner cylinder 30, the space between the lid 37 and the free piston 31 is made an air chamber C, while the space between the free piston 31 and the plunger 60 is made an oil chamber B.

The free piston 31 is airtightly held within the inner cylinder 30 through piston rings 32, 32 and an O-ring 33. It divides the interior of the inner cylinder 30 into the oil chamber B and the air chamber C, and moves due to the difference in pressure between both the chambers B and C so as to absorb the pressure difference.

The flange 34 is fittingly secured to the left end of the inner cylinder 30 by screw threads 35. It is provided with bolt penetrating holes 36 in order to couple the shock absorber to a structure on a side directly subject to a shock, such as the bumper side of a car. The shock due to a collision is transmitted from, for example, the bumper of the car to the flange 34, and then to the inner cylinder.

The lid 37 is closely fitted inside the inner cylinder 30 through an O-ring 38, it is airtightly joined to the inner end face of the flange 34 with another O-ring 39 held therebetween, and it is coupled to the flange 34 by check bolts 40, 40. In this manner, it tightly closes the other end part of the inner cylinder 30.

The lid 37 is provided with an air inlet 41, through which pneumatic air 43 is sealed into the air chamber C of the inner cylinder 30 from the exterior. The air chamber C is adjusted to the same pressure as that of the oil chamber A. During use of the shock absorber, the air inlet 41 is closed by a plug 42.

The plunger 60 is coupled by screw threads 61 to that end part of the inner cylinder 30 which is fittingly inserted into the outer cylinder 10. Further, it is airtightly fitted inside the outer cylinder 10 through an O-ring 63 which is equipped in an annular groove 62 formed at the outer periphery of the plunger 60 and which is supported by a back metal 64. In this manner, the inner cylinder 30 and the plunger 60 move as a unit.

In the plunger 60, there is formed a tapered oil flow bore 65 which leads towards the oil chamber B. The oil flow bore 65 continues into a hole 66 which opens into the oil chamber A.

The hole 66 formed in the plunger 60 is so arranged that the front end part of the tapered portion 51 of the tapered rod 50 may be concentrically inserted thereinto. The tapered portion 51 and the hole 66 constitute the variable-area orifice 70 which varies the clearance area when the inner cylinder 30 moves along the outer cylinder 10.

Figure 2:
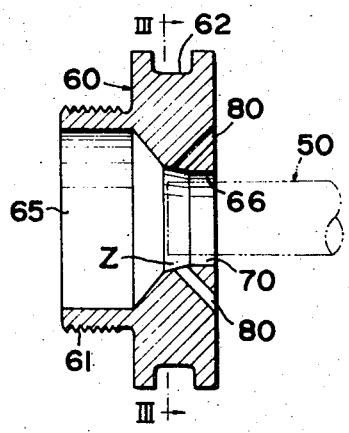
FIG. 2 is an enlarged front view, in vertical section, of a plunger portion in the first embodiment.
Figure 3:
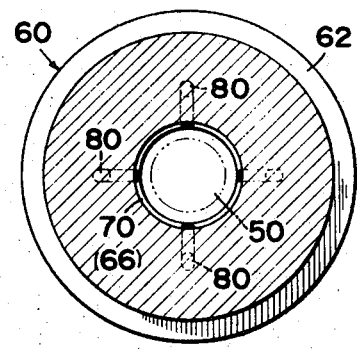
FIG. 3 is a side sectional view taken along lines III — III in FIG. 2.

The plunger 60 is formed with apertures 80 which are separate from the variable-area orifice 70. As shown in FIGS. 2 and 3, the apertures 80 are so provided as to originate from the end face of the plunger 60 opposite to the oil chamber B, to obliquely extend in the interior of the plunger 60 and to open to a jet region immediately downstream of the variable-area orifice 70. Four such apertures are provided at equal intervals on a circumference.

Figure 4:
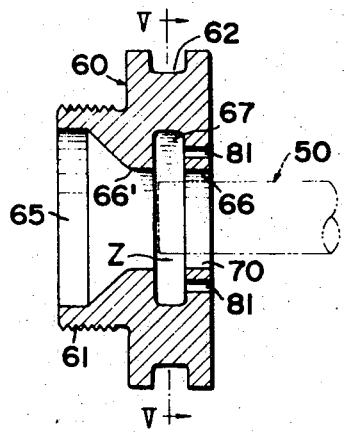
FIG. 4 is an enlarged front view, in vertical section, of a plunger portion in the second embodiment of the present invention.
Figure 5:
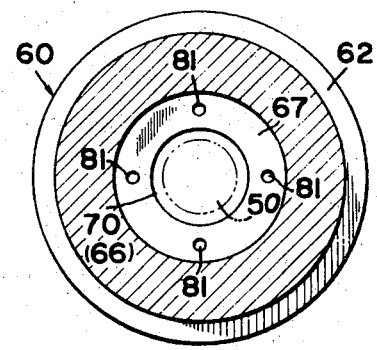
FIG. 5 is a side sectional view taken along lines V — V in FIG. 4.

Shown in FIGS. 4 and 5 in the second embodiment of the present invention. An annular groove 67 is formed between the oil flow bore 65 and the hole 66 which are provided in the plunger 60. The hole 66, the annular groove 67 and the oil flow bore 65 are caused to communicate.

Apertures 81 are provided so as to originate from the end face of the plunger 60 opposite the oil chamber B, to extend parallel to the hole 66 in the interior of the plunger 60 and to communicate with the annular groove 67. Also four such apertures 81 are provided at equal intervals on a circumference of the plunger 60. In this embodiment, the second hole 66 parallel to the hole 66 with the annular groove 67 located therebetween defines a jet region immediately downstream of the orifice 70.

When the plunger 60 moves in the direction of an arrow X in FIG. 1, a pressure drop is caused by an oil sucking-out action attributed to a negative pressure attendant upon a jet from the variable-area orifice 70. The apertures 80 and 81 in the first and second embodiments function so as to suck out the operating oil 17 in the oil chamber A towards the oil chamber B by a suction attributed to the pressure drop.

Figure 6:
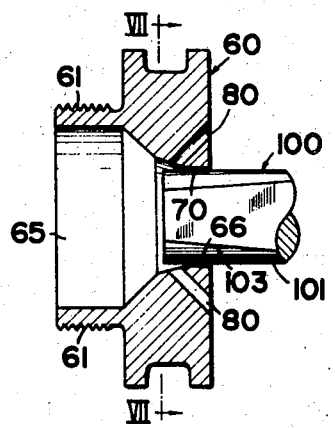
FIG. 6 is an enlarged front view, in vertical section, of a variable-area orifice portion in the third embodiment of the present invention.
Figure 7:
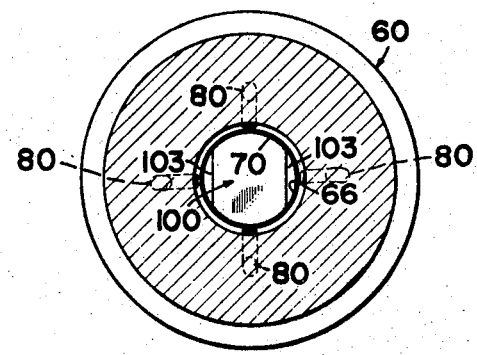
FIG. 7 is a sectional view taken along lines VII — VII in FIG. 6.

Shown in FIGS. 6 and 7 is the third embodiment of the present invention. It involves a modification of the rod 50 in the first and second embodiments. The constructions of the plunger 60, the outer cylinder 10, the inner cylinder 30 and the other components are the same as in the first embodiment.

A rod 100 in this embodiment has a straight portion 101 and a screw portion (not shown). The straight portion 101 has an outside diameter such that it enables it to slidingly fit the hole 66 provided in the plunger 60. Further, taper cut portions are provided at parts of the peripheral surface of that front end of the straight portion 101 which slidingly fits the hole 66.

The taper cut portions are formed into taper cut surfaces 103 of such shape that the peripheral surface of the straight portion 101 is cut away so as to define smooth inclined planes each gradually increasing in depth towards the front end. The taper cut portions are provided at equal intervals in two places of the peripheral surface of the straight portion 101.

Figure 8:
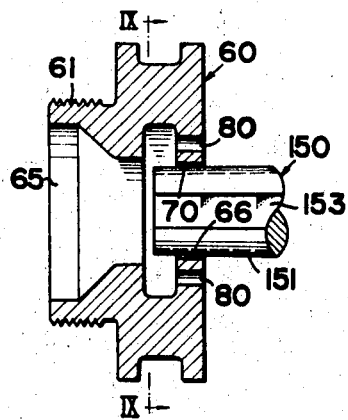
FIG. 8 is an enlarged front view, in vertical section, of a variable-area orifice portion in the fourth embodiment of the present invention.
Figure 9:
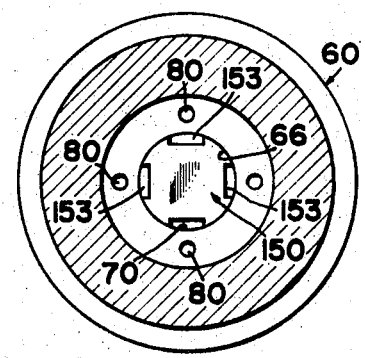
FIG. 9 is a sectional view taken along lines IX — IX in FIG. 8.

Shown in FIGS. 8 and 9 is the fourth embodiment of the present invention, which involves a modification of the rod 50. The constructions of the plunger 60, the outer cylinder 10, the inner cylinder 30 and the other components are the same as is the second embodiment. Similarly to the third embodiment, a rod 150 in this embodiment has a straight portion 151 and a screw portion (not shown), and taper cut portions are provided at the periphery of the front end part of the straight portion 151.

The taper cut portions are formed into taper cut grooves 153 of such shape that the peripheral surface of the straight portion 151 is deeply cut away so as to define inclined notches each gradually increasing the depth towards the front end. The taper cut portions are provided at equal intervals in four places of the peripheral surface of the straight portion 151.

The third and fourth embodiments are the same as the first and second embodiments in that the front end part of the straight portion 101 or 151 is fittingly received in the hole 66 formed in the plunger 60, and that the single variable-area orifice which varies the clearance area at the movement of the plunger 60 is constituted of the hole 66 and the taper cut portions, namely, the taper cut surfaces 103 or taper cut grooves 153 formed in the straight portion 101 or 151.

In the third and fourth embodiments, the straight portion 101 or 151 of the rod 100 or 150 has the outside diameter set so as to slidingly fit the hole 66, so that the alignment of both the members is achieved by merely fitting the straight portion into the hole 66. The position of the variable-area orifice constituted of the hole 66 and the taper cut surfaces 103 or taper cut grooves 153 is also determined.

Moreover, the hole 66 of the plunger 60 and the straight portion 101 or 151 also serve as a guide for the movement of the inner cylinder 30 and the plunger 60, and the plunger 60 moves along the straight portion 101 or 151. As a result, any deformation of the variable-area orifice attributable to the eccentricity between the hole and the rod is prevented, and therewith, any fluctuation in the energy absorbing characteristic of the shock absorber is prevented.

The operation of the shock absorber of the present invention will now be described in respect of the first embodiment.

When the flange 34 senses an impact in the direction of an arrow Y in FIG. 1 and due to a collision, the inner cylinder 30 is pressed inwards, and the inner cylinder 30 and the plunger 60 advance together into the outer cylinder 10. Owing to the cooperation between the hole 66 of the plunger 60 and the taper rod 50, the variable-area orifice changes so that the area may become smaller. As a result of the change in the area the operating oil in the oil chamber A flows out, as shown by arrow z in FIG. 1, from the variable-area orifice 70 through the oil flow bore 65 into the oil chamber B. With the resultant pressure rise in the oil chamber B, the free piston 31 moves in the direction of an arrow W in FIG. 1 by virtue of the back pressure. The impact is absorbed by resistance forces owing to the foregoing series of operating steps.

At a collision at high speed, the velocity of the operating oil flowing through the variable-area orifice 70 is higher. Thus, the pressure drop becomes stronger around the jet region immediately downstream of the variable-area orifice 70.

Owing to a suction force attendant upon the pressure drop, the operating oil in the oil chamber A is powerfully sucked out through the apertures 80.

As a result, the internal pressure of the oil chamber A shifts in a moderate velocity-dependency without being increased in proportion to the square of the velocity. When the load due to the collision is removed, the free piston 31 is pressed back by the air cushion action of the air chamber C in the inner cylinder 30, to bring the operating oil 17 in the oil chamber B back into the oil chamber A. Then, the various members are restored to the state in FIG. 1.

The operations of the second, third and fourth embodiments of the present invention are similar to the operation explained above in connection with the first embodiment.

Figure 10:
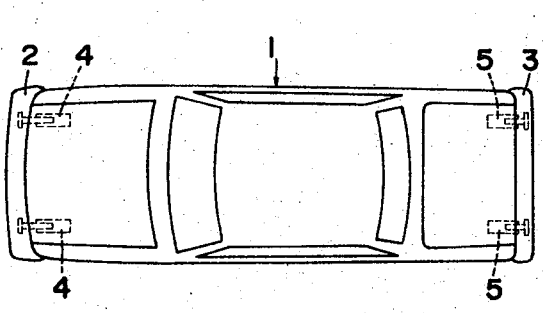
FIG. 10 is a view for explaining the aspect of performance in which the shock absorbers of the present invention are assembled into the bumpers of a car.

FIG. 10 illustrates an embodiment in which the shock absorbers according to the present invention are applied to a car. Every two of the shock absorbers are assembled between a car body 1 and a front bumper 2 and between the car body 1 and a rear bumper 3 so as to absorb shocks at collisions.

Figure 11:
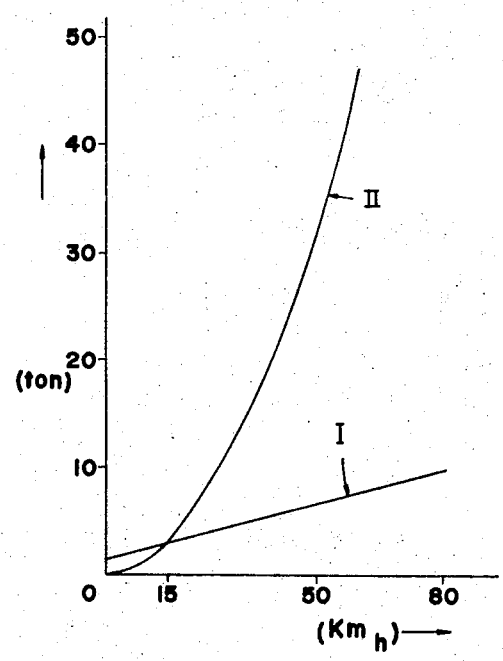
FIG. 11 is a graph of the performance comparison between the shock absorber of the present invention and a prior-art shock absorber of the velocity-dependent type.

FIG. 11 is a graph of the performance comparison between the shock absorber of the present invention and the prior-art shock absorber of the velocity-dependent type. As represented in the figure, the prior art (II) exhibits resistance forces proportional to the square of velocities, whereas the present invention (I) demonstrates resistance forces of moderate velocity-dependency owing to the action of the apertures.

What we claim is:

1. A shock absorber, comprising:
   an outer cylinder one end part of which is closed and the other end part of which is opened,
   an inner cylinder which slides inside said outer cylinder and one end of which is closed,
   a plunger which is coupled to the other end of said inner cylinder, an inner hole formed in said plunger,
   a free piston which is housed in said inner cylinder,
   a rod which is insertedly provided inside said outer cylinder and having its effective cross-sectional area reduced gradually from its root towards its front end,
   a variable-area orifice formed between said inner hole and said rod by the insertion of said rod into said inner hole, and
   an aperture in said plunger, said aperture extending from an end face of said plunger confronting an oil chamber in the outer cylinder and communicating said oil chamber with a jet stream area immediately downstream of said variable-area orifice whereby oil in the oil chamber of the outer cylinder flows through said variable-area orifice and also through said aperture to the jet stream area immediately downstream of the variable-area orifice to an oil chamber in the inner cylinder when a pressure drop occurs adjacent the jet stream area immediately downstream of said variable-area orifice.

2. The shock absorber as defined in claim 1, wherein said rod has a taper towards its front end to be inserted into said hole of said plunger.

3. The shock absorber as defined in claim 1, wherein said rod has a straight portion which is formed into such outside diameter that it slidingly fits into said hole of said plunger, and said straight portion is formed with at least one taper cut surface of such shape that it is cut away so as to define at least one smooth inclined plane gradually increasing its depth towards said front end to slidingly fit into said hole.

4. The shock absorber as define in claim 3, wherein a plurality of said taper cut surfaces are provided at equal intervals in a peripheral surface of said straight portion of said rod.

5. The shock absorber as define in claim 1, wherein said rod has a straight portion which is formed into such external shape that it slidingly fits into said hole, and said straight portion is formed with at least one taper cut groove of such shape that it is cut away so as to define at least one inclined notch gradually increasing its depth towards said front end to slidingly fit into said hole.

6. The shock absorber as define in claim 5, wherein a plurality of said taper cut grooves are provided at equal intervals in a peripheral surface of said straight portion of said rod.

7. The shock absorber as define in claim 1, wherein a plurality of said apertures are provided at equal intervals on a circumference of said plunger in a manner to obliquely pass through the interior of said plunger.

8. The shock absorber as define in claim 1, wherein said at least one aperture passes through the interior of said plunger parallel to said hole of said plunger and communicates with an annular groove leading to said hole.

* * * * *